United States Patent
Nordstrom (12) 
(10) Patent No.: US 6,269,329 B1
(45) Date of Patent: *Jul. 31, 2001

(54) INPUT AND OUTPUT COMMUNICATION IN A DATA PROCESSING SYSTEM

(75) Inventor: Rabbe Nordstrom, Castletownroche (IE)

(73) Assignee: Softmark Limited, Castletownroche (IE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,851

(22) Filed: Nov. 10, 1997

(30) Foreign Application Priority Data

Nov. 8, 1996 (EP) .................................... 96650050

(51) Int. Cl.[7] .............................. G10L 13/08; G06F 17/20
(52) U.S. Cl. ................................. 704/1; 704/258; 706/55
(58) Field of Search ................................. 704/9, 201, 258, 704/10, 270, 275, 1; 395/710, 680, 682, 685; 707/100, 103; 706/47, 55, 60; 705/35

(56) References Cited

U.S. PATENT DOCUMENTS

| | | | |
|---|---|---|---|
| 4,982,340 | * 1/1991 | Oyanagi et al. | 706/55 |
| 5,282,265 | * 1/1994 | Rohra Suda et al. | 704/9 |
| 5,325,465 | * 6/1994 | Hung et al. | 706/55 |
| 5,615,112 | * 3/1997 | Liu Sheng et al. | 707/104 |
| 5,615,300 | * 3/1997 | Hara et al. | 704/260 |
| 5,685,000 | * 11/1997 | Cox, Jr. | 704/9 |
| 5,727,120 | * 3/1998 | Van Coile et al. | 704/206 |
| 5,765,160 | * 6/1998 | Yamaguchi | 707/103 |
| 5,809,283 | * 9/1998 | Vaidyanathan et al. | 395/500 |
| 5,812,863 | * 9/1998 | Ishikawa | 707/533 |
| 5,819,260 | * 10/1998 | Lu et al. | 707/3 |
| 5,974,413 | * 10/1999 | Beauregard et al. | 707/6 |
| 6,094,654 | * 7/2000 | Van Huben et al. | 707/8 |
| 6,131,085 | * 10/2000 | Rossides | 705/1 |
| 6,163,785 | * 12/2000 | Carbonell et al. | 704/4 |

FOREIGN PATENT DOCUMENTS

| | | |
|---|---|---|
| 4323021 | 9/1994 | (DE) . |
| 0052757 | 6/1982 | (EP) . |
| 0720090 | 7/1996 | (EP) . |
| 0720106 | 7/1996 | (EP) . |

OTHER PUBLICATIONS

Patent Abstracts of Japan, Publication No. 07319538, published Dec. 8, 1995, Nissan Electric Co. Ltd.

* cited by examiner

Primary Examiner—William Korzuch
Assistant Examiner—Martin Lerner
(74) Attorney, Agent, or Firm—Jacobson Holman, PLLC (57) ABSTRACT

A processor (47) uses a concepts memory area (10) to interpret received inputs and to generate coherent content-related output communication in text or fluent speech. The processor (47) uses concepts, each being a part of program code and a linked basic communication element. A parallel recursive communication matrix manager (10(a)) is used in processing of the concepts and reference is made to a conception, learning, associative utilisation manager (50) to assist in understanding inputs, learning and enhancing the knowledge base, and in developing outputs. The basic communication elements may trigger associated speech resources (24) which are retrieved and processed downstream, or rule-based speech outputted via a synthesiser (63).

18 Claims, 5 Drawing Sheets

INPUT AND OUTPUT COMMUNICATION IN A DATA PROCESSING SYSTEM

FIELD OF THE INVENTION

The invention relates to communication in a data processing system of the "intelligent" type such as an expert system. Such a system may, for example, be based on the neural network principle and may be exclusively rule-based or may include a case based reasoning (CBR) system.

PRIOR ART DISCUSSION

The purpose of intelligent systems is to learn or adjust to a multitude of inputs or stimuli and allow a multitude of possible results, i.e. there may be a number of "correct" results. These results cause events to occur such as the automatic transmission of a signal to a financial institution to cause lodgement of money to an account. Development of such systems has progressed to the stage where some can operate in a "hands off" mode for considerable periods of time.

However, such features are of little benefit if there is inadequate input and output communication. For output communication, in some cases system events can be communicated by display of numbers or numerical functions in a clear manner.

However, it is increasingly the case that for the important events to be understood, much more comprehensive communication is required. For example, it is desirable that the system be capable of outputting coherent speech to indicate the events which have occurred, and indeed events which may occur in the future, depending on user inputs. It is also desirable that the system be capable of understanding inputs with much less human intervention, and preferably little or no human intervention.

Heretofore, the approach to generating output communication has been to select or build pre-determined messages. For example, in DE4323021 a system accesses, interrelates, and combines prototype patterns to generate a composite image output. In JP07319538 a building monitoring system is described in which audio data is selected and outputted according to abnormal state information. In EP0052757B a method is described in which various tables are used by a message build program to display one of a set of pre-determined messages.

In these systems the basic principle is operation of a communication means to select portions of messages and to combine them together. This approach is apparently satisfactory for many situations, such as for generating alerts to indicate specific and predetermined events, such as a fault in a diskette door. However, where comprehensive system event information is to be communicated for a complex data processing system it would be necessary to store a very large number of message parts and it would be unworkable to retrieve and process these messages in a meaningful manner. Further, it would be extremely difficult to foresee all possible communication which may arise in the future. The prior systems do not generate coherent communication describing any and every possible system event irrespective of the probability of them arising.

European Patent Specification Nos. EP0720090A2 and EP0720106A2 both describe systems which provide a speech output. In these specifications, a "concept" is described as an entity having successive sub-sets in "ever decreasing circles". The speech output is based on user inputs and the knowledge base is user-dependent. While these systems are undoubtedly of benefit in some applications, there is limited capability for providing a coherent output and for understanding a wide range of inputs.

Further, while the prior art includes many systems for reading inputs such as OCR systems, little has been done to integrate this function with the data processing. In addition, the prior art does not generate a coherent and contents-related output.

The invention is directed towards providing a data processing system and method to overcome these problems.

SUMMARY OF THE INVENTION

The invention provides a communication method for interpreting communication and building output communication, the method being carried out by a system comprising a processor, a memory, an input device, and an output device, characterized in that:

the processor automatically interprets inputs, and the processor generates coherent contents-related communication using a communication means linked with data processing program code.

According to another aspect, the invention provides a data processing system comprising a processor, a memory, an input device, and an output device, characterized in that:

the processor comprises means for automatically interpreting inputs, and the processor comprises means for generating coherent contents-related communication using a communication means linked with data processing system code.

An important point is that because communication is generated in-line in a manner linked with the data processing program code, the communication is contents-related and it is therefore possible to provide coherent communication within the confines of the knowledge base of the system.

In one embodiment, the communication means comprises communication elements, each communication element being linked to a part of program code. Because the data processing system links the communication elements with the associated data processing code as a unit, the communication is bound strongly to the contents of the communication as it arises from the data processing.

Preferably, the communication elements are processed in one memory area, either actual or virtual. By processing in the one memory area, the processor can efficiently combine the communication elements and also update a knowledge base. The memory area may be time-dependent or time-independent.

In one embodiment, the processor processes communication elements linked with program code representing processing results, and communication elements linked with program code used for interim processing before a result is determined. This allows very comprehensive output communication as it provides not only the results of data processing, but also the methodology behind the results.

Preferably, the processor operates according to a matrix manager for capturing communication elements during data processing. This is a very simple tool for capturing communication elements from various different strands of data processing and it in effect synchronizes the generation of communication.

Preferably, the matrix manager directs capture of communication elements for each of a plurality of data processing simulations. There are many situations in which different simulations are required and only one simulation is eventually chosen. By capturing elements from all simulations, there is no delay in generation of the communication after one is chosen.

Preferably, the matrix manager is a parallel recursive function. This is a very effective type of function for the task involved.

In one embodiment, the communication elements are triggers which are used to retrieve resources including text or speech strings. The use of triggers opens up the possibility of a wide range of further processing to manipulate the output as desired. In one example, the matrix manager comprises output communication rules which are activated by the triggers to generate processed communication elements. Such rules may comprise prosodic, phonetic, syntactic and semantic processing rules. Such processed elements may be used to retrieve resources to control a synthesiser. It will therefore be appreciated that by use of triggers, a large degree of additional processing can be carried out to enhance the quality of the output in terms of such things as loudness and intonation, pauses etc.

In one embodiment, the system comprises speech resources, a speech resources assembly manager, and a speech resources reference buffer, the assembly manager and the reference buffer performing the steps of:

loading blocks of resources to a memory;

monitoring speech output and determining when resources of a block are nearly Utilized;

loading a fresh block; and clearing the previous block when a fresh block is activated.

This is a particularly efficient way of handling resources for generation of output communication.

Preferably, the resources are used to build coherent output communication which is further automatically edited before output.

In one embodiment, the processor automatically interprets inputs with reference to a knowledge base which is incremented during processing. Preferably, the knowledge base comprises a plurality of datasets, each accessed by an associated manager. It has been found that by having managers which are responsible for updating particular datasets, there is very efficient building of a knowledge base in a manner whereby the knowledge can be easily retrieved during processing.

Preferably, the managers are part of a conception, learning, associative, and utilisation manager including:

definition of terms manager which performs a full text analysis of inputs to define as many terms as possible, and a validation manager which performs validation operations on the defined terms.

This allows very comprehensive and flexible interpretation of received communication to streamline flow of input communication.

In one embodiment, the conception, learning, associative, and utilization manager further comprises:

a review specification manager which determines if a term has been used in a similar context before, for validation; and a synonym and acronym manager which searches an associated file for synonymous terms.

Preferably, the processor automatically learns by building the knowledge base, using the knowledge base and communication elements as references.

In another embodiment, the conception, learning, associative, and utilization manager performs automatic learning by adding terms to the datasets as they are recognized to fall within the associated term criteria. Preferably, the processor prompts user input of data to build the knowledge base.

DETAILED DESCRIPTION OF THE INVENTION

BRIEF DESCRIPTION OF THE DRAWINGS

The invention will be more clearly understood from the following description of some embodiments thereof given by way of example only with reference to the accompanying drawings in which.

DESCRIPTION OF THE PREFERRED EMBODIMENTS

Figure 1:
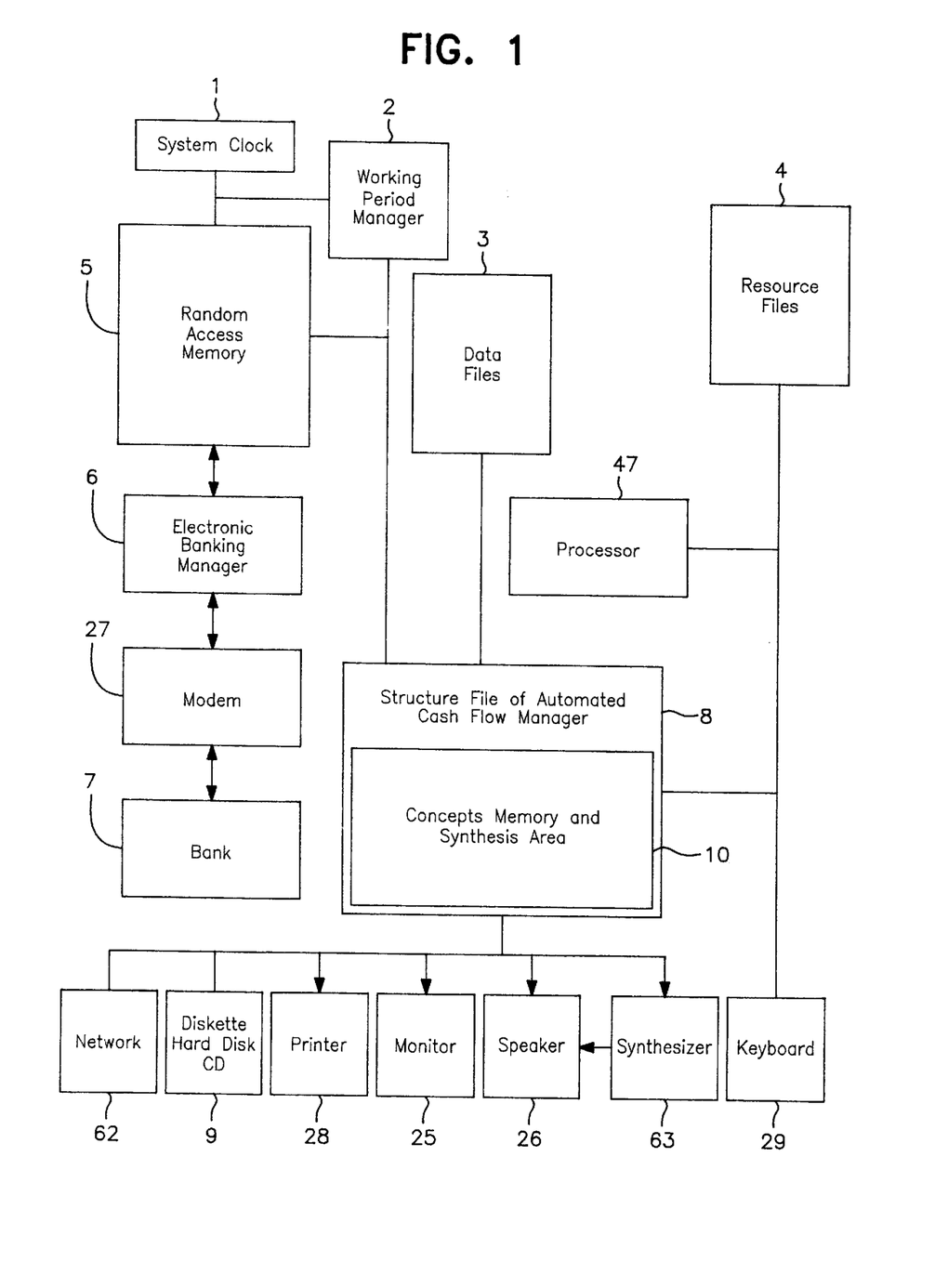
FIG. 1 is an overview schematic representation of an expert system of the invention.

Referring to the drawings and initially to FIG. 1 there is shown an expert system of the invention. As illustrated, the system comprises a system clock 1, a working period manager 2 connected to the clock 1, data files 3, a resource file 4, a random access memory (RAM) 5 and an electronic banking manager 6. A bank system 7 communicates with the electronic banking manager 6 via a modem 27. The bank system 7 is not part of the expert system 1. The system also includes a processor 47. The system comprises a structure file 8 of an automated cash flow manager which uses a memory area 10, referred to as a concepts memory and synthesis area. Although shown separately, the area 10 is part of the RAM 5. The system also comprises disk and CD ROM drives 9, a monitor 25, a speaker 26, a printer 28 and a keyboard 29. A synthesizer 63 is connected to the speaker 26. The system is also connected to a network 62 from which inputs are received and to which outputs are transmitted.

At the purely hardware level, the system is conventional (in this embodiment a microcomputer) and indeed the method of the invention may be carried out by a wide range of hardware systems when suitably programmed. There may be multiple processors.

Figure 2:
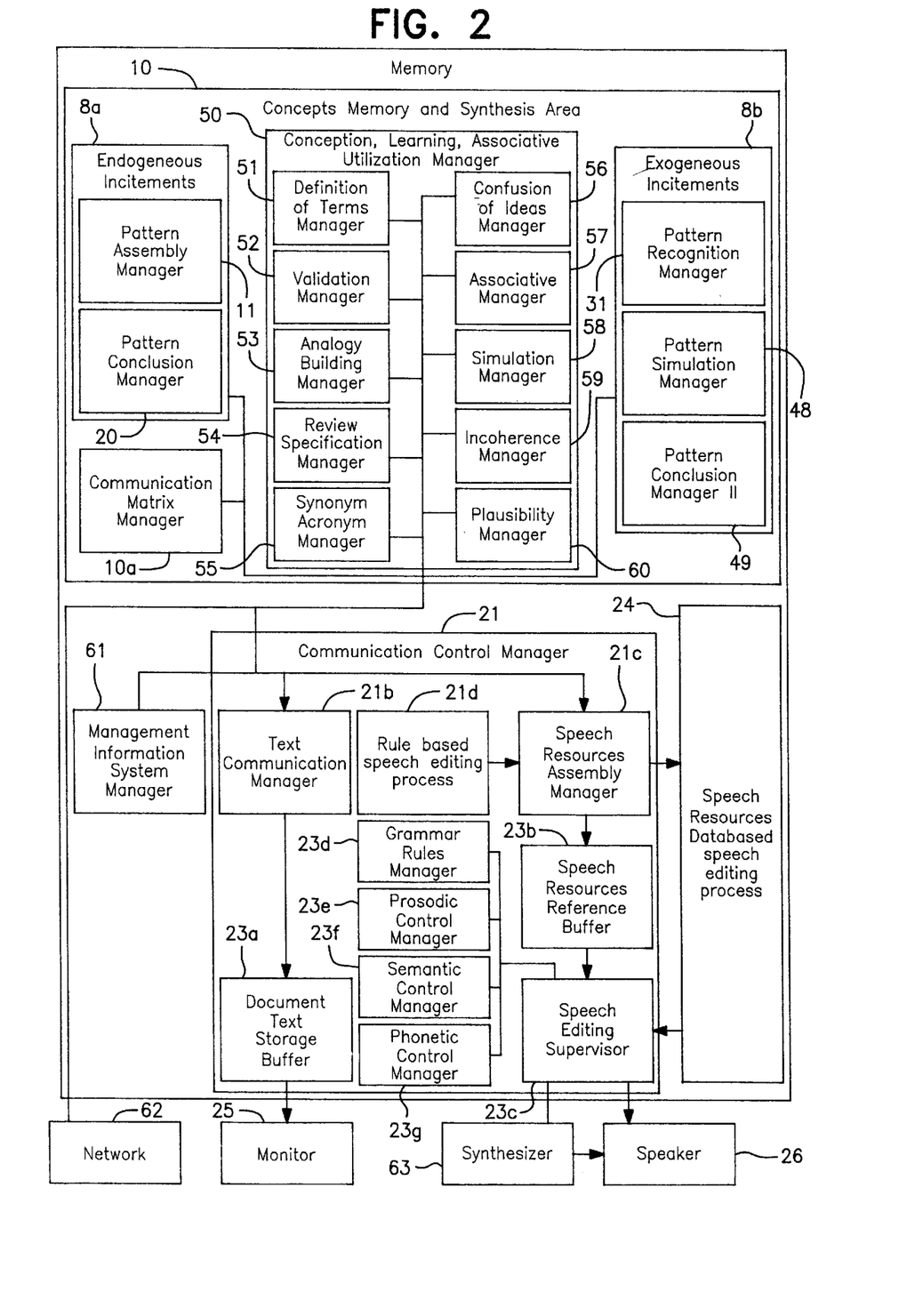
FIG. 2 is a block diagram showing the system in more detail.

The structure file 8 is shown in detail in FIG. 2 in combination with the memory which it utilized. For processing of signals or stimuli which arise within the system there is a pattern assembly manager 11 and a pattern conclusion manager I 20. For processing of stimuli which are received from an external source there is a pattern recognition manager 31, a pattern simulation manager 48, and a pattern conclusion manager II 49. The series of managers 11 and 20 and the series of managers 31, 48, and 49 are connected to a conception, learning, and associative utilization (CLAU) manager 50.

An important aspect of the memory area 10 is that the various blocks can be independently activated and the process flow is not necessarily sequential through them. Another important aspect is that the system is capable of performing data processing and of generating coherent contents-related output communication within the confines of its knowledge base. The knowledge base comprises various datasets in the data files 3 and associated with the managers in the CLAU 50. All internal stimuli handled by the managers 11, 20 and 10a are within this knowledge base. However, the managers 31, 48, and 49 process external stimuli, some of which may not be within the knowledge base. These managers utilize the CLAU manager 50 to assist with inputs which are not understood, for example, by performing validation, synonym/acronym, or incoherence processing. The "external" managers 31, 48 and 49 either clarify or fail to clarify these signals. If clarified, they are processed as if they were internal signals, for example by the "internal" managers 11, 20, and 10*a*. If not clarified, the user is prompted to assist.

Thus, the CLAU manager 50 is generally used by the "external" managers 31, 48, and 49 if received inputs cannot be understood and also for broadening the existing knowledge base.

In summary, the input communication is understood by the "external" managers 31, 48, and 49. The data processing and coherent output communication may be generated by the "external" managers 31, 48, and 49 and/or by the "internal" managers 11, 20, and 10*a*. The CLAU manager 50 is used for understanding inputs and for broadening the knowledge base. Stimuli which are generated internally are always understood and are processed by the "internal" managers 11, 20, and 10*a*. Therefore, there is also an "understanding" of contents, enabling contents-related speech output.

Before describing how the "internal" and "external" managers operate the following describes the CLAU manager 50 in more detail.

51—Definition of terms manager. This performs a full text analysis of variable electronic input devices in order to define as many terms as possible, either by comparing those terms with a formerly memorized database or by selecting new terms within a predefined range of probability.

52—Validation manager. This takes the defined terms of the manager 51 and performs a validation control.

53—Analogy building manager. This determines if an identified term has some meaning for the system's control process. For example, if the system is able to identify some terms like "value added tax" (VAT), "increase" and some numeric specification like "8%". As a consequence, the analogy building manager first controls the current settings for value added tax, will recognize that there is some change (in the sense of an increase) and will state that there could be some change from other VAT specifications. This will be presented to the user as a question if the increase is real and if this has any consequences for the system settings.

54—Review specification manager. This determines if an identified term has been used in a different or similar context during the past. If so, the system analyzes under what circumstances this term has been used and what decisions were made that time. According to this, the system can decide to proceed in the same way once more or not.

55—Synonym and acronym manager. This searches within a specific file for synonymous terms in order to determine if the selected term has a corresponding item which can be used within the communication building process. This is of importance if the system uses preconfigured speech resources which are addressed by pointers. If there is no predefined speech resource for the original item for which the system can identify a synonymous term, the pointer is set on the corresponding speech resource specification.

56—Confusion of ideas manager. The confusion of ideas manager evaluates if the selected terms have any correlation to each other or if the plausibility is too low, in order to build the communication process out of the terms found.

57—Associative manager. The associative manager compares different terms with each other, regarding each term's surrounding context. This means that a term which the system has found to be strictly used in the business vocabulary usually will not be mentioned in the communication building process, for example, for medical discussion.

58—Simulation manager. The simulation manager is needed, for example for the automatic bank report analysis. If a corresponding record, for example in the invoices file, is found, the system doesn't stop at this point. It continues to search for other possibilities, not taking the first choice as the obviously best one.

59—Incoherence manager. The incoherence manager checks if the words and sentences which are queued up by the communication building process have sufficient correlation to each other, so that the result makes sense to a human being.

60—Plausibility manager. The plausibility manager is active in the case of endogenous as well as in the case of exogenous incitements, in order to distinguish between two or more possible answers and, if possible, to decide for the right choice. On the other side, the plausibility manager also takes control for example in the debit entry analyzer 33, where the total sum is compared with the amounts registered in the past. If there is some suspicious deviation, the system generates a corresponding comment.

The output from the concepts memory area 10 is fed to downstream modules to complete building of coherent contents-related output communication indicating the system events. These include a speech resources assembly manager 21(*c*) which utilizes a speech editing process 21(*d*) and speech resources 24, and which feeds into a speech resources reference buffer 23(*b*). The buffer 23(*b*), a grammar rules manager 23(*d*), a prosodic control manager 23(*e*), a semantic control manager 23(*f*) and a phonetic control manager 23(*g*) all feed into a speech editing supervisor 23(*c*), which in turn controls the speaker 26 either directly or via a synthesizer 63.

For output of text communication, the output of the concepts memory area 10 is fed into a text communication manager 21(*b*), which in turn feeds into a document text storage buffer 23(*a*), in turn driving the monitor 25. In addition, there is a management information system manager 61 which receives data from the concepts memory area 10.

Figure 3:
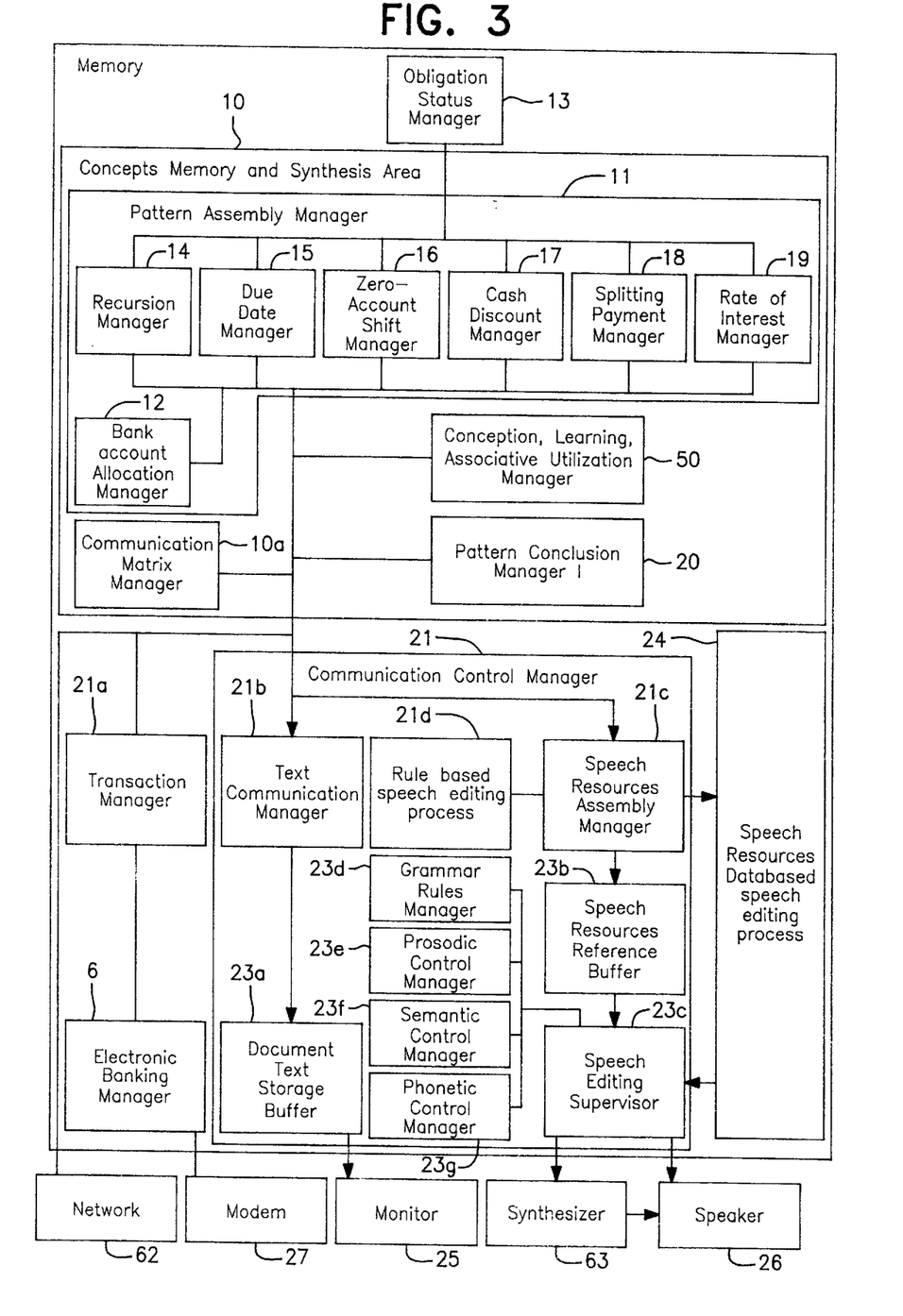
FIGS. 3 and 4 are still more detailed views showing the system at a lower level.

Referring now to FIG. 3, those parts of the structure file for operation in response to internally-generated stimuli or endogenous incitements are illustrated. There is an obligation status manager 13 connected to the pattern assembly manager 11. The pattern assembly manager 11 comprises the following components. These components implement data processing and generate coherent contents-related output communication for the particular type of expert system.

14—Recursion manager. The recursion manager calculates the optimized result, regarding a variable number of combinable variables. In the example of cash management this means that the manager tries to implement a number of obligations within a number of accounts by using the method of recursive processing. The system selects a certain obligation and one of the defined accounts and controls, if this combination fits. Then it starts incrementing the obligations amount and tries to combine the different obligations with regard to the given account status. When the manager reaches an optimum result, the specified variables are memorized and the search is performed for the next account. At the end, the system decides for the highest degree of optimization and selects the most opportune solution. The recursion manager also takes into consideration the available funds and degrees the remaining items to the subsequent term of payment.

15—Due date manager. The due date manager examines if there are any liabilities, e.g. invoices for the actual working period, taking into consideration the defined terms and conditions of payment for each of the invoices.

16—Zero-account shift manager. The zero-account shift manager examines the remaining possibilities with regard to optimized cash flow—when it is indicated to charge a liability from an account, where the actual amount on the credit side is not high enough to pay it from one single account. 17—Cash discount manager. The cash discount manager analyzes which liabilities could be met with regard to an offered discount. According to the opportune guidelines the system tries to benefit by paying.

18—Splitting payment manager. The splitting payment manager takes into consideration that the current amount cannot be paid from one single account without overdraft and selects two or more accounts, in order to split the amount due with regard to an optimized cash flow. The decision—which amount and which accounts are selected—depends mainly on the system preferences, which specify if the recipient accepts a split payment or not 19—Rate of interest manager. The rate of interest manager analyzes the rates which are due by overdrafts of the accounts and selects the most favorable combination, which not only depends on the rate itself, but also on the actual amount overdraft present on the accounts. In co-operation with the cash discount manager 17 the system decides, if it is opportune, to remit payment at present or to defer it to a subsequent term of payment.

12 Bank account allocation manager. The bank account allocation manager selects the most opportune account, regarding the actual amount on the credit as well as with regard to the interest rate for overdrafts, in order to start further calculations with the first selected liability.

FIG. 3 also shows those components which use the output of the concepts memory area 10. There is a transaction manager 21(a) connected to an electronic banking manager 6 which feeds the modem 27 in addition to those described with reference to FIG. 2.

Figure 4:
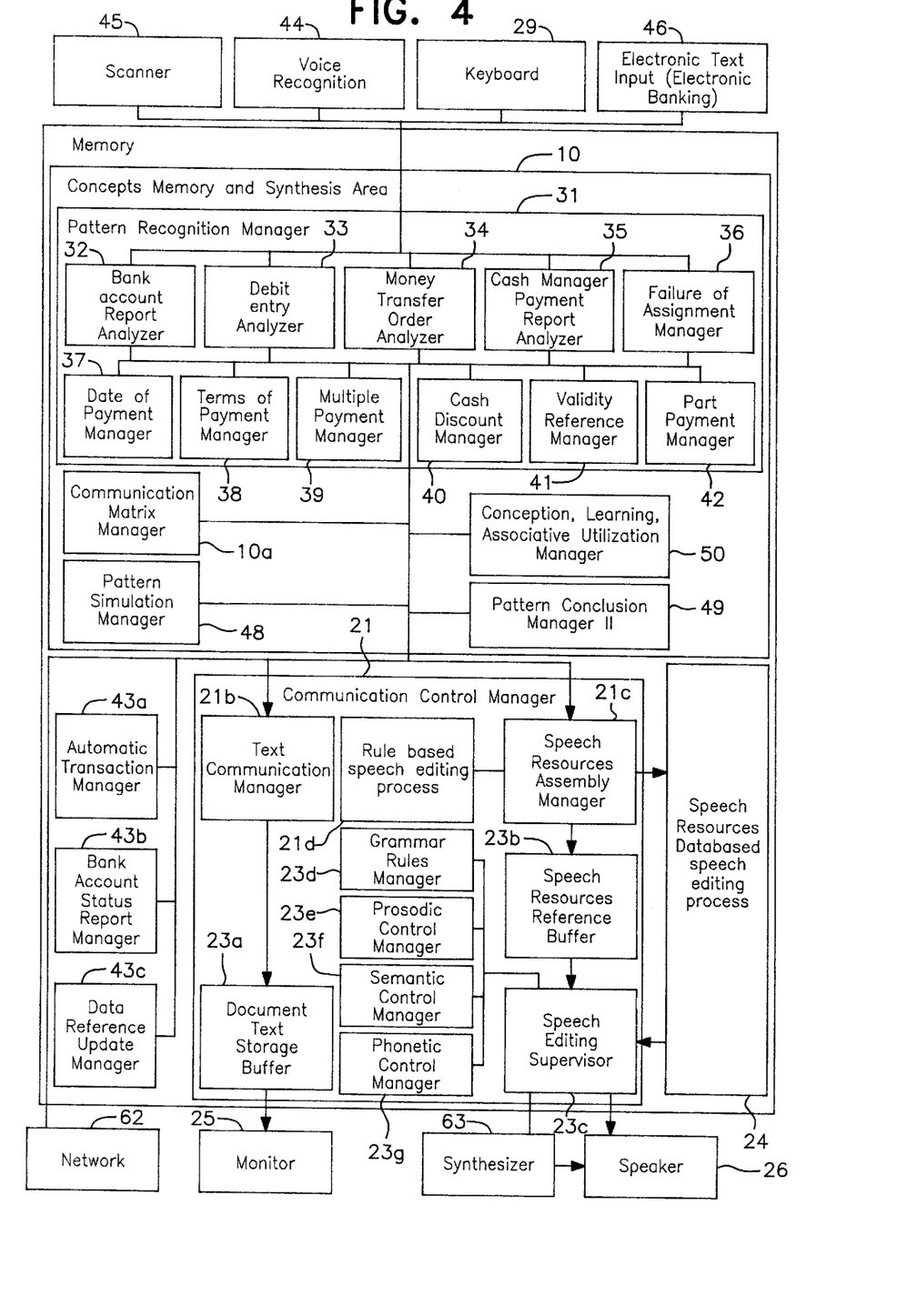

Referring to FIG. 4, particular detail of the structure file in the concepts memory area is shown for processing of external stimuli or exogenous incitements. These inputs are received from a voice recognition system 44, a scanner 45, the keyboard 29, and an electronic text input system 46. The pattern recognition manager 31 comprises the following components.

32—Bank account report, analyzer. The bank account report analyzer imports the actual statements of the different accounts electronically and starts analyzing the contents. It takes not only the documentation into consideration, but also the transferred amount as well as the item's transaction and date specifications.

Furthermore, the bank account report analyzer starts multidimensional searches in the database files, in order to select the most likely records. When there is a number of more than one possible answer for a certain item, the manager carries out a plausibility control regarding possible specifications like invoice number, client number, client name, date of invoicing, date of transaction, transferred amount etc.

33—Debit entry analyzer. The debit entry analyzer identifies all transactions of debit or credit to an account according to registered debit notes. The system not only examines if there is a registered legitimization for booking the different debit notes, by also implements different plausibility functions. It checks if the current amount exceeds the usual range, if the term of booking is within the estimated timeframe etc. Furthermore it induces the bookkeeping process to generate the complete bookkeeping reference. Thereby, the system works according to standard bookkeeping rules.

34—Money transfer order analyzer. The money transfer order analyzer works similarly to the debit entry analyzer 33, examining the transfer orders which have been arranged with the different banks. Furthermore the money transfer order analyzer generates the corresponding complete bookkeeping process by allocating the actual amount to the predefined booking statements.

35—Cash manager payment report analyzer. The cash manager payment report analyzer evaluates all processes that debit the accounts as a consequence of transactions which were sent by the system to the different banks according to the cash management calculations one or two days before (compare endogenous incitements).

36—Failure of assignment manager. This manager controls all items which debit or credit an account, but could not be allocated by the different managers described above. By using some retrieval procedures, analyzes if similar or analogous processes have taken place in the past and tries to allocate the corresponding item.

37—Date of payment manager. The date of payment manager checks all invoices according to evaluated bank account status and examines if the date of payment corresponds to the date due. If not, the systems induces a reminder process for the amount due.

38—Terms of payment manager. The terms of payment manager checks all invoices according to the evaluated bank account status and examines if the terms of payment i.e. with regard to discounts etc. are met. If not, the systems induces a reminder process for the remaining amount due.

39—Multiple payment manager. The multiple payment manager determines if a payment which is credited to an account related to one or more than one invoice. For example, if a client collects several invoices and pays them at once, the system has to evaluate the bank account status and has to check which invoice records should be addressed within the database. This is especially difficult when there are discounts which have been taken by the client, or when the client pays several invoices at once, and the amount represents only a part of all unpaid invoices.

40—Cash discount manager. The cash discount manager checks all invoices according to the evaluated bank account status and examines if the client was entitled to take the discount. If not, the system induces a reminder process for unpaid amount.

41—Validity reference manager. The validity reference manager tries to identify if a term which has been identified within a bank status report is valid enough to be used as a separator term, for example in order to distinguish between different invoice records.

42—Part payment manager. The part payment manager recognises when a liability is partly remitted. The manager has to decide if a reminder process should be initiated, or if the remaining amount due remains within the database for a further clearing procedure.

All of the above modules are part of the pattern recognition manager 31 and feed into the pattern simulation manager 48.

Again, the output from the memory area 10 feeds into speech and text output modules as illustrated in FIGS. 2 and 3. However, in addition there is an automatic transaction manager 43(a), a bank account status report manager 43(b), and a data reference update manager 43(c).

As is clear from the above description the expert system of the invention is programmed to perform cash management operations in which decisions are made as to how money should be managed. In each case there will be a number of possible decisions, many of which are generally correct, and the system operates to determine the optimum overall result. The resulting event may be lodgement of an entry to a joint account, transmission of a signal to the bank system for lodgement of money, payment of invoices, or directing printing of cheques for payment of invoices.

The invention resides in understanding inputs and building output communication about the events for users. This is achieved in a dynamic and flexible manner which may be in real time. The output communication is both in text and in speech. An important feature is that as the data is being processed, basic communication elements are processed in combination with linked or associated program code. Together, these may be regarded as a "concept", which is:

(a) the basic program code part relating to the fact, matter, result, or any event for which there is a need for communication, and (b) the corresponding means for communication.

Thus, it will be noted from FIG. 4 that the managers of the pattern recognition manager 31 perform data processing with integrated communication operations using concepts. As stated above, the system generates coherent output communication within the confines of its knowledge base— the data files 3 and the managers 51–60 in the CLAU manager 50. This knowledge base is used to determine if inputs can be processed, and some inputs are used to build the knowledge base. The learning function is automatic and it uses the concepts and the knowledge base as references. It also uses interactive user inputs. A simple example of learning is addition of received words to a synonym file by the synonym and acronym manager 55. The word is added to the file after confirmation by a user. On the other hand automated learning may take place by addition of a word to a synonym table if the relationship is clear after operation of the review specification manager 54. Another example of automated learning is addition of a word which is known from an algorithm to a data file.

Figure 5:
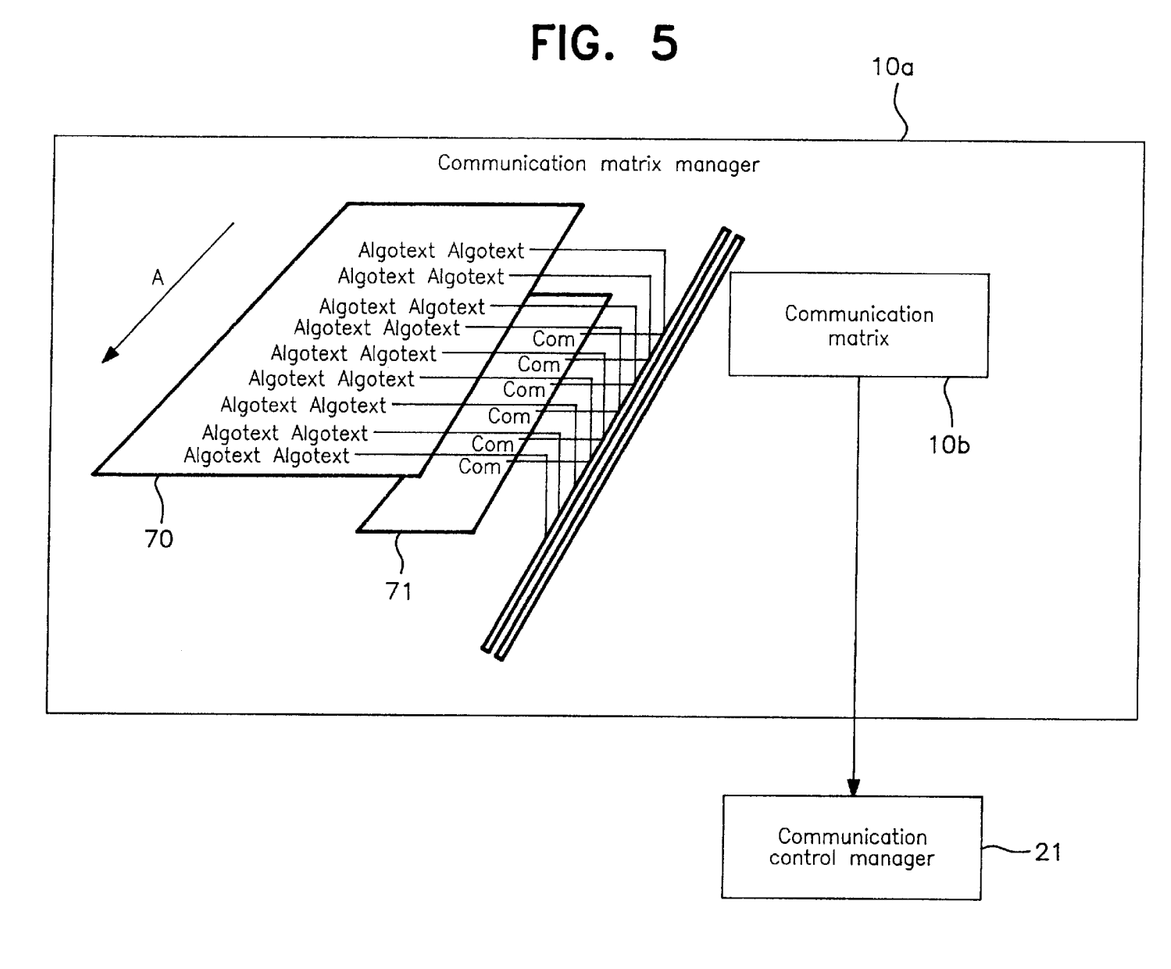
FIG. 5 is a diagram illustrating the manner in which coherent output communication is generated.

The generation of coherent output communication is illustrated in FIG. 5. The arrow A indicates the program flow of the processor using lines 70 of code. Some of the lines 70 have associated communication elements, in this embodiment resource triggers 71. By virtue of the fact that the triggers are linked inherently with the program flow, they combine together in sequence to achieve correct syntax and coherency. In other words, the output communication is linked directly with the program flow and is thus always coherent and has correct syntax within the confines of the knowledge base of the program flow. The communication matrix manager 10a captures the flow of triggers and essentially acts as a transfer buffer between the data processing managers and the communication control manager 21.

Because the communication is directly linked with the program flow in this manner, it is contents-related, comprehensive, and flexible. For example, the same words are used to provide different meanings in different contexts. The communication building is self-organizing with operation of the matrix manager and a quantitatively and qualitatively unlimited variety is achieved. Thus, the output communication is not foreseeable with regard to quantity or contents. There is also flexibility with regard to initiation of a communication—it may be the user or the system.

In more detail, the basic elements of communication may be single letters, combinations of letters, words, combinations of words, sentences, combinations of sentences, phonetic expressions, numbers, combinations of numbers, figures, or combinations of figures. Generation of concepts in this manner allows communication in both directions. The system coherently generates communication to output information about the events, and it coherently evaluates received data and communicates the results to the user. Any suitable programming language may be used for the program code. The important point is that the generic elements for communication, or alternatively codes which trigger corresponding communication elements, are associated with the corresponding program code to form concepts. Therefore, a variable as well as dynamic connectivity between syntactic elements is provided for. This may be accomplished in one embodiment by specification of entry and exit points to enable subclauses, interjections and even specification of grammar rules which are essential.

In a further embodiment multidimensional commands with descriptive elements for intonation, syntax, phonetics, prosodic control and semantics as well as information elements describing the contents are linked with the communication matrix manager, thus providing complete information needed for contents-related speech output.

A system bound adaptive prosodic method is integrated whereby the system itself recognizes, for example, unusual events and as a consequence of this alters the pronunciation to stress the unusual situation.

It is preferable that the communication elements are situated within the same memory area. In the specific example of speech, a preferred embodiment is to store the speech resources elsewhere and trigger them with the elements for communication within the concepts memory area, thus allowing speech editing with regard to semantics, prosodic and grammar control.

This basic architecture also allows the resources to be stored remote from the concepts memory area 10, either in a local or remote network. Thus, there is little network traffic in relation to the volume of output communication as only triggers (and/or a single matrix) are transmitted over the network.

In more detail, the speech resources are triggered in a manner whereby they are not loaded in sequence, but instead as blocks of twenty resources at one time. This enables fluent speech and avoids memory overflow. This is achieved by operation of an index table of the speech resources 24 monitoring the process and recognizing when a block of resources is nearing its end. It loads the next block and after the new block has started it clears the memory of the previous block. Sentences are formulated with an open end. Thus, they may be of any variable length. A time-dependent handling of the speech in blocks is more practical than byte-related handling as required by the prior art such as EP0052757B. As the matrix contains all contents-related information needed for a humanlike speech the matrices are used in some embodiments together with the communication control manager 21 to command a synthesizer 63. In these embodiments the speech output is rule-based and not data-based as described for some other embodiments referred to above.

The system handles data differently depending on whether or not it originated within the system (endogenous) or externally of the system (exogenous). These differences are illustrated in FIGS. 2, 3 and 4. The important point is that the endogenous data does not need to be recognized before it is processed. For the exogenous stimuli the pattern recognition manager 31 performs the necessary recognition functions before pattern simulation and conclusion.

Within the concepts memory 10, the CLAU manager 50 corrects, evaluates, or changes communication built up or recognized by the managers in the memory area 10 (see FIG. 2). For example, the manager 55 will not reject an exogenous incitement which, with the exception of one word, is otherwise coherent with regard to its contents. In other words, it is understood when and if the word in question is a synonym to another which is stored in a concept in the memory are 10. A more comprehensive description of the functions of the manager 51 to 60 which make up the CLAU manager 50 is given above. The important point is that they interact with the expert system managers 11, 20, 31, 48 and 49 to assist in communication understanding and generation.

As stated above, received information is interpreted, and output communication is generated in an integrated manner during data processing, using concepts. Communication is understood and built using basic communication elements which should not be confused with pre-defined messages or alerts, because they are used in understanding and building coherent communication in an entirely flexible manner. This communication is purpose-built from the elements of communication linked to the basic program code during data processing with the assistance of the matrix manager 10*a*.

The first part of the Appendix (A1) provides code samples of the pattern assembly manager 11, which recognizes inputs. This allows, for example, automatic understanding of who has paid monies, for which reason, and when.

The first page of the Appendix includes data processing code relating to account balances and split payments. Concept synthesis is then started by the first line of the second page, namely *A. The line *B activates a comment building procedure, and the line *C activates a speech building procedure. The data is indicated by a trigger "ArrInsElemStr (>◊ArrSprache;"522") which refers to Array Instruction Element string 522 in the speech resources 24. The Appendix includes many explanatory comments explaining to the reader the communication building process. It will be apparent that both comment (text) and speech communications are generated simultaneously. The lines following the explanatory comments after line *C include triggers to additional resources, and these are in turn followed by more program code. The subsequent lines *D, *E, and *F start procedures as set out and are followed by more triggers. It will be noted that the triggers and program code are blended together in a very flexible manner to allow simultaneous data processing and generation of communication. The Appendix A2 gives an example of code for the pattern recognition manager 31, which deals with external stimuli. Again, the same principle applies. In this example, the line *G activates a concept synthesis procedure and a text comment building procedure is activated by line *H. A speech building process is activated by line *I and this is followed by triggers for generation of output communication. The functions of the above three is repeated for the lines *J, *K, and L, with different data.

The matrix manager 10*a* is an entity which contributes to the building process of communication in an online mode. It is a parallel recursive function which is constantly available to the managers with which it operates. Its function is not dependent on the presence of a reference table. This is due to the fact that the elements are by no means limited, as with the prior art. For example, it interacts with the Bank Account Report Analyser 32 by selecting several elements within the analyzer 32 and comparing them to stored data. The plausibility is then checked and if found true all elements analysed will be stored for later output. Accordingly, new elements are stored in a manner which enables the system to team by widening its knowledge base. The matrix manager 10*a* may therefore be regarded as a general tool used in the concepts memory area to assist in processing elements or concepts for sorting, comparison, input or output. This is achieved by constantly scrolling through the elements or concepts for communication building. At its simplest, the matrix manager 10(*a*) captures communication elements and transfers them to the communication control manager 21 in a certain order. If the data processing involves multiple simulations, elements for each simulation are stored and are immediately available for use. A more complex system may include rules in the matrix manager which receive the elements as inputs and generate processed elements for transfer on. For example, there may be prosodic, phonetic, syntactic, and semantic specification rules and also speech pause rules. A single trigger may be used by a number of rules to generate processed elements which combine together to give a comprehensive output.

A synchronous formation of the matrix enables parallel in-line and immediate output of text and/or speech. On the other hand, asynchronous formation is preferred if there is no need for a time-dependent immediate output.

It will be appreciated that the invention provides a method and system for understanding inputs and generating coherent communication outputs in an entirely flexible manner. Each communication output is entirely new as it is built up from small elements and corresponds coherently to the events which occurred. Because the communication is built up during processing in an integrated manner, it is contents-related and it informs the user not only of occurrence of an event, but also why the event occurred and how the event affects other events. For example, if the event is the fact that no processing result is possible, then the output communication will specify why there was no result. This is extremely important for users of an expert system.

It will also be appreciated that there is considerable flexibility in communication output. For example, there are no pre-defined endings to sentences—text is added until a coherent communication reflecting the events is achieved. The communication is thus open-ended and this complex information may be communicated at "any length". The only tables which are used are ones storing basic numerals 0 to 9 and the alphabet—communication being dynamically understood and built online. In effect, what the invention has achieved is to combine input and output communication with the core processing in order to simulate the ability of a human to understand what processing is taking place and to communicate on the basis of this understanding. This is in contrast to the prior art, in which elements of output communication are formulated according to a relatively rigid structure.

In summary, the technical communication steps achieve the result of a fluent and coherent output—just like a person explaining the events. For example, a graphical representation of a talking man may be generated on screen while the coherent speech is outputted. The comment text may be simultaneously displayed.

APPENDIX

Appendix A1

Concepts Synthesis within the Pattern Assembly Manager for accounts, endogenous incitements

APPENDIX-continued

```
c_boolean(◇vAllocated)
◇vAllocated:=False
SEARCH for accounts
    where the balance is greater than 0 before payment of one of the invoices
    where the balance is greater than 0 after the payment of one of the invoices
    where the balance is greater than the predefined minimum after payment
    where the cash flow automatisation status is set to true
    If the number of the according accounts is greater than 0
                ◇vPayCond:="Paying within the positive range"
                ◇vAllocated:=True
    End if
    If ((◇vAllocated=False) & (◇vSpliCancel=False))
        SEARCH for accounts
            where the balance is greater than 0 before the payment of one of the
            invoices
            where the cash flow automization status is set to true
            If (the sum of amounts of the selected accounts>=◇vAmountAkt)
                FK_Prior_Num("Plus")
                If (◇vAblNight=False)
                    If ((◇vFKNumber<=◇vSplNumMax) & (◇vSpliBool=True))
                        ◇vPayCond:="Splitting"
                        ◇vAllocated:=True
                    Else
                        ◇vPayCond:FK_PriorityPl ($1)
            *A          Start Concept Synthesis
                        Start Splitting Payment Manager
                        Check, if the primary settings for splitting payment are followed
            *B          Start the comment building process and add the followings terms:
                        • the invoice number of the current invoice
                        • the offered cash discount
                        • Offer the user to switch the current settings according to the needed
                            status
            *C          Start the speech building process and add the follow. ref. numbers:
                        ArrInsElemStr (>>◇ArrSprache;"522")
                        Speech resource 522 standing for the character "a"
                    CharAnalyse1 ( >>◇ArrSprache;[BankStatusReport]ID)
                        procedure CharAnalyse1 analyses the parameter, which is presented by the
                        variable [BankStatusReport]ID. According to the length of the term and
                        the digits within the term the procedure CharAnalyse1 appends the
                        pointers for the different speech resources (for example Sp.R. 501 for digit
                        "1", Sp.R. 552 for character "a" and so on). Every pointer to a certain
                        speech resource is added to the speech-array ◇aSprache.
                    ArrInsElemStr (>>◇ArrSprache;"641")
                    ArrInsElemStr (>>◇ArrSprache;"704")
                    CharAnalyse3 (>>◇ArrSprache;$Amount)
                        procedure CharAnalyse3 analyses a real number, which is presented by
                        the variable "$Amount". From digit to digit the procedure assigns a
                        speech resource and adds the pointer to this resource to the speech-array
                            ◇aSprache.
                    ArrInsElemStr (>>◇ArrSprache;"112")
                    ArrInsElemStr (>>◇ArrSprache;"103")
                    ArrInsElemStr (>>◇ArrSprache;"101")
                End if
            Else
                If ((◇vFKNumber<=◇vSplNumMax) & (◇vSpliBool=True))
                    ◇vPayCond:="Splitting Payment"
                    ◇vAllocated:=True
                End if
            End if
        End if
    End if
    If (◇vAllocated=False)
    Search for all accounts
            where the balance is greater than 0 before the payment of one of the invoices
            where the cash flow automization status is set to true
            If the sum of amounts of the selected accounts>=◇vAmountAkt)
                FK_Prior_Num("PlusMinus")
                    If (◇vAblNight=False)
                    Case of
                        : (◇FKNumber>1)
                            If (◇vSpliCancel=False)
                    If ((◇FKNumber<=◇vSplNumMax) & (◇vSpliBool=True))
                            ◇vPayCond:="Splitting Payment"
                            ◇vAllocated:=True
                        Else
                            ◇vPayCond:=FK_PriorityP2 ($1)
            *D          Start Concept Synthesis
                        Start Splitting Payment Manager
            *E          Start the comment building process and add the following terms:
```

APPENDIX-continued

```
                            • the invoice number of the current invoice
                            • the offered cash discount
                            • the difference between the offered cash discount and the needed
                                payment according to the rate of interest, if the invoice should be
                                payed now
            *F          Start the speech building process and add the follow. ref. numbers:
                        ArrInsElemStr (>> ◊ ArrSprache;"604")
                        Speech resource 552 standing for the partial work "Split"
                        CharAnalyse1 (>> ◊ Sprache;[BankStatusReport]ID)
                            procedure CharAnalyse1 analyses the parameter, which is presented
                            by the variable [BankStatusReport]ID). According to the length of the
                            term and the digits within the term the procedure CharAnalyse1
                            appends the pointer for the different speech resources (for example
                            Sp.R. 501 for digit "1", Sp.R. 552 for character "a" and so on). Every
                            pointer to a certain speech resource is added to the speech-array
                                ◊ aSprache.
                        ArrInsElemStr (>> ◊ ArrSprache;"707")
                        ArrInsElemStr (>> ◊ ArrSprache;"115")
                        CharAnalyse3 (>> ◊ ArrSprache;$Difference)
                            procedure CharAnalyse3 analyses a real number, which is presented
                            by the variable "$Difference". From digit to digit the procedure
                            assigns a speech resource and adds the pointer to this resource to the
                            speech-array ◊ aSprache.
                        ArrInsElemStr (>> ◊ ArrSprache;"127")
                        ArrInsElemStr (>> ◊ ArrSprache;"895")
                        ArrInsElemStr (>> ◊ ArrSprache;"222")
                End if
            End if
        :( ◊ vFKNumber=1)
            ◊ vPayCond:="Splitting Payment"
            ◊ vAllocated:True
End case
```

Appendix A2

```
Concepts Synthesis within the Pattern Recognition Manager for accounts,
exogeneous incitements
C_TEXT(◊ vComment)
C_LONGINT($i)
◊ vComment:=""
USE SET("BankStatusReportSet")
FIRST RECORD([BankStatusReport])
RecLoadWait (>>[BankStatusReport])
For ($i;1;Records in selection([BankStatusReport]))
    [BankStatusReport]DocuText:=SpaceDelete ([BankStatusReport]DocuText)
    Case of
        : ([BankStatusReport]Amount>0)
            If (AuszugFilterRA ("NichtBeNumt")=True)
                [BankStatusReport]Detected:=True
                SAVE RECORD([BankStatusReport])
            Else
                If (AuszugFilterZE=True)
                    [BankStatusReport]Detected:=True
                    SAVE RECORD([BankStatusReport])
                Else
                    If (AuszugFilterRA ("BeNumt")=True)
                        [BankStatusReport]Detected:=True
                        SAVE RECORD([BankStatusReport])
                    Else
*G                      Start Concept Synthesis
*H                      Start the comment building process and add the following terms:
                        If (Length(◊ vComment)#0)
                            ◊ vComment: ◊ vComment+ ◊ CR+ ◊ CR
                        End if
                        ◊ vComment:= ◊ vComment+"Filtervorgang: Bankauszug Nummer"
                            +[BankStatusReport]ID+":"+ ◊ CR
                        ◊ vComment:= ◊ vComment+"Eine Zourdnung ist bislang noch nicth
                            möglich!"
*I                      Start the speech building process and add the follow. ref. numbers:
                        ArrInsElemStr (>> ◊ ArrSprache;"552")
                        CharAnalyse1 (>> ◊ ArrSprache;[BankStatusReport]ID)
                        ArrInsElemStr (>> ◊ ArrSprache;"553")
                    End if
            End if
```

```
            End if
        : ([BankStatusReport]Amount<0)
            If (StatusFiltDebit =True)
                [BankStatusReport]Detected:=True
                SAVE RECORD([BankStatusReport])
            Else
                If (StatusFilterZA =True)
                    [BankStatusReport]Detected:=True
                    SAVE RECORD([BankStatusReport])
                Else
*J                  Start Concept Synthesis
*K                  Start the comment building process and add the following terms:
                    If (Length(◇vComment)#0)
                        ◇vComment:= ◇vComment+ ◇CR+ ◇CR
                    End if
                    ◇vComment:= ◇vComment+"Filtervorgang: Bankauszug Nummer"
                    +[BankStatusReport]ID+":"+ ◇CR
                    ◇vComment:= ◇vComment+"Eine Zuordnung ist bislang nicht möglich!"
*L                  Start the speech building process and add the follow. ref. numbers:
                    ArrInsElemStr (>> ◇ArrSprache;"552")
                    CharAnalyse1 (>> ◇ArrSprache;[BankStatusReport]ID)
                    ArrInsElemStr (>> ◇ArrSprache;"553")
                End if
            End if
        End case
        NEXT RECORD([BankStatusReport])
        RecLoadWait (>>[BankStatusReport])
End for
```

What is claimed is:

1. A communication method carried out by a system comprising a processor, a memory, an input device, and an output device, the method comprising;

interpreting, at the processor, inputs with reference to a knowledge base having a conception, learning, associative and utilization (CLAU) manager, said CLAU manager including a synonym and acronym manager which searches an associated file for synonymous terms, and a review specification manager which determines if a term has been used in a similar context before, for validation;

retrieving program code comprising a sequence of instructions, said instructions including,
instructions for performing data processing; and
interspersed instructions for generating output communication to convey information about data processing events arising from said data processing and including contents-related communication elements;

processing at the processor, data retrieved from memory according to said program code to internally determine data processing events, said processor operating in accordance with a matrix manager for capturing communications elements, said matrix manager including prosodic, phonetic, syntactic and semantic processing rules; and during said data processing, the processor dynamically generating said contents-related communication elements according to said program code to convey information about said data processing events, said generation of communication elements being integrated with determination of the data processing events because the instructions for performing data processing are interspersed with the instructions for generating output communication; and generating, by said matrix manager, processed communication elements through application of said prosodic, phonetic, syntactic and semantic processing rules.

2. The method as claimed in claim 1, wherein the matrix manager directs capture of communication elements for each of a plurality of data processing simulations.

3. The method as claimed in claim 1, wherein the matrix manager is a parallel recursive function.

4. The method as claimed in claim 1, wherein the communication elements are triggers which are used to retrieve resources including text or speech strings.

5. The method as claimed in claim 4, wherein the prosodic, phonetic, syntactic and semantic processing rules of the matrix manager are activated by the triggers to generate said processed communication elements.

6. The method as claimed in claim 4, wherein the system comprises speech resources, a speech resources assembly manager, and a speech resources reference buffer, the assembly manager and the reference buffer performing the steps of:

loading blocks of resources to a memory;
monitoring speech output and determining when resources of a block are nearly utilised;
loading a fresh block; and
clearing the previous block when a fresh block is activated.

7. The method as claimed in claim 4, wherein the resources are used to build coherent output communication which is further automatically edited before output.

8. The method as claimed in claim 1, wherein the knowledge base comprises a plurality of datasets, each accessed by an associated manager.

9. The method as claimed in claim 8, wherein the conception, learning, associative, and utilization manager further includes:

a definitions of terms manager which performs a full text analysis of inputs to define as many terms as possible, and a validation manager which performs validation operations on the defined terms.

10. The method as claimed in claim 1, wherein the conception, learning, associative, and utilization manager performs automatic learning by adding terms to the datasets as they are associated with term criteria.

11. The method as claimed in claim 1, wherein the processor automatically learns by building the knowledge base, using the knowledge base and communication elements as references.

12. The method as claimed in claim 1, wherein the processor prompts user input of data to build the knowledge base.

13. A method of dynamically generating a communication related to content of associated data processing code, the method comprising the steps of:

interpreting, at a processor, inputs with reference to a conception, learning, associative and utilization manager having a synonym and acronym manager which searches an associated file for synonymous terms;

retrieving program code structured as a plurality of concepts, each concept being an integral combination of data processing code and a communication element;

processing at the processor, data retrieved from memory according to said program code to internally determine data processing events, said processor operating in accordance with a matrix manager for capturing communications elements, said matrix manager being a parallel recursive function having prosodic, phonetic, syntactic and semantic processing rules;

during said data processing, the processor dynamically capturing communication elements associated with data processing code for each concept to generate a series of communication elements conveying information about said data processing events, said series of communication elements being formed by the sequential capture of communication elements in a sequence order determined by concept order;

applying, by said matrix manager, said prosodic, phonetic, syntactic and semantic processing rules to said communication elements to generate processed communication elements; and outputting said processed communication elements to a communication control manager.

14. The method as set forth in claim 13, the step of outputting including the step of transferring the processed communication elements to said communication control manager in an order dictated by the order of the concepts.

15. The method as set forth in claim 13, the step of outputting including processing said processed communication elements into an appropriate output format for a user.

16. The method as set forth in claim 15, wherein the communication elements are alphanumeric characters.

17. The method as set forth in claim 13, wherein the communication elements are codes that trigger stored resources.

18. A method of dynamically generating a communication from a content of associated data processing code using a system having a processor, a memory and a matrix manager, the method comprising the steps of:

interpreting, at the processor, inputs with reference to a conception, learning, associative and utilization (CLAU) manager, said inputs including terms, said step of interpreting including, performing, by a definitions of terms manager within said CLAU manager a full text analysis of inputs to define as many terms as possible;

performing, by a validation manager within said CLAU manager, validation operations on the defined terms; and searching, by a synonym and acronym manager within said CLAU manager, an associated file for synonymous terms;

retrieving program code structured as a plurality of concepts, each concept being an integral combination of data processing code and a communication element, said communication element for conveying information about data processing events arising from execution of associated data processing code within said concept;

processing at the processor, data retrieved from memory according to said program code to internally determine data processing events; and dynamically capturing, concurrently with data processing and using a parallel recursive function of the matrix manager, said communication elements associated with data processing code for each concept to generate a series of communication elements conveying information about said data processing events, said matrix manager applying prosodic phonetic, syntactic and semantic processing rules to said communication elements to generate processed communication elements.

* * * * *